(12) United States Patent
Catchings

(10) Patent No.: US 9,107,481 B2
(45) Date of Patent: Aug. 18, 2015

(54) CONTAINER CARRIER

(75) Inventor: Michael Dennis Catchings, Savoy, TX (US)

(73) Assignee: Michael Dennis Catchings, Savoy, TX (US)

( * ) Notice: Subject to any disclaimer, the term of this patent is extended or adjusted under 35 U.S.C. 154(b) by 348 days.

(21) Appl. No.: 13/471,626

(22) Filed: May 15, 2012

(65) Prior Publication Data

US 2013/0306119 A1    Nov. 21, 2013

(51) Int. Cl.
| | | |
|---|---|---|
| A45B 3/00 | (2006.01) | |
| A45B 9/00 | (2006.01) | |
| A61G 5/10 | (2006.01) | |
| F16M 13/02 | (2006.01) | |
| F16M 11/08 | (2006.01) | |
| F16B 2/10 | (2006.01) | |
| A61H 3/00 | (2006.01) | |

(52) U.S. Cl.
CPC ... *A45B 3/00* (2013.01); *A61G 5/10* (2013.01); *A45B 2009/002* (2013.01); *A61H 2003/002* (2013.01); *A61H 2201/0161* (2013.01); *A61H 2201/0192* (2013.01); *F16B 2/10* (2013.01); *F16M 11/08* (2013.01); *F16M 13/02* (2013.01)

(58) Field of Classification Search
CPC ...... A45B 3/00; A45B 2009/002; A61G 5/10; A47K 1/09

USPC ........................ 135/65, 66; 224/407, 409, 420
See application file for complete search history.

(56) References Cited

U.S. PATENT DOCUMENTS

| | | | | |
|---|---|---|---|---|
| 4,887,784 A | * | 12/1989 | Kayali | 248/311.2 |
| 5,086,958 A | * | 2/1992 | Nagy | 224/544 |
| 5,102,086 A | * | 4/1992 | Thomason | 248/311.2 |
| 5,139,222 A | * | 8/1992 | Koorey et al. | 248/311.2 |
| 5,522,527 A | * | 6/1996 | Tsai | 224/414 |
| 5,580,020 A | * | 12/1996 | Catchings | 248/311.2 |
| 5,901,891 A | * | 5/1999 | Douglass | 224/407 |
| 6,663,086 B2 | * | 12/2003 | Huang | 254/344 |
| D537,402 S | * | 2/2007 | Smith | D12/223 |
| 7,726,327 B2 | * | 6/2010 | Battiston | 135/67 |
| 2002/0070324 A1 | * | 6/2002 | Huang | 248/311.2 |

* cited by examiner

*Primary Examiner* — David R Dunn
*Assistant Examiner* — Danielle Jackson
(74) *Attorney, Agent, or Firm* — Peter V. Schroeder

(57) ABSTRACT

Disclosed is a container carrier that mounts on a walker device or the like to pivot from the interior to the exterior of the device so that the interior of the device is not obstructed, and the required clearance of the device in restricted spaces is not substantially increased. The container carrier has a flexible mounting capacity, accommodates various sizes and shapes of containers, and is assembled from parts that are inexpensive to manufacture.

17 Claims, 7 Drawing Sheets

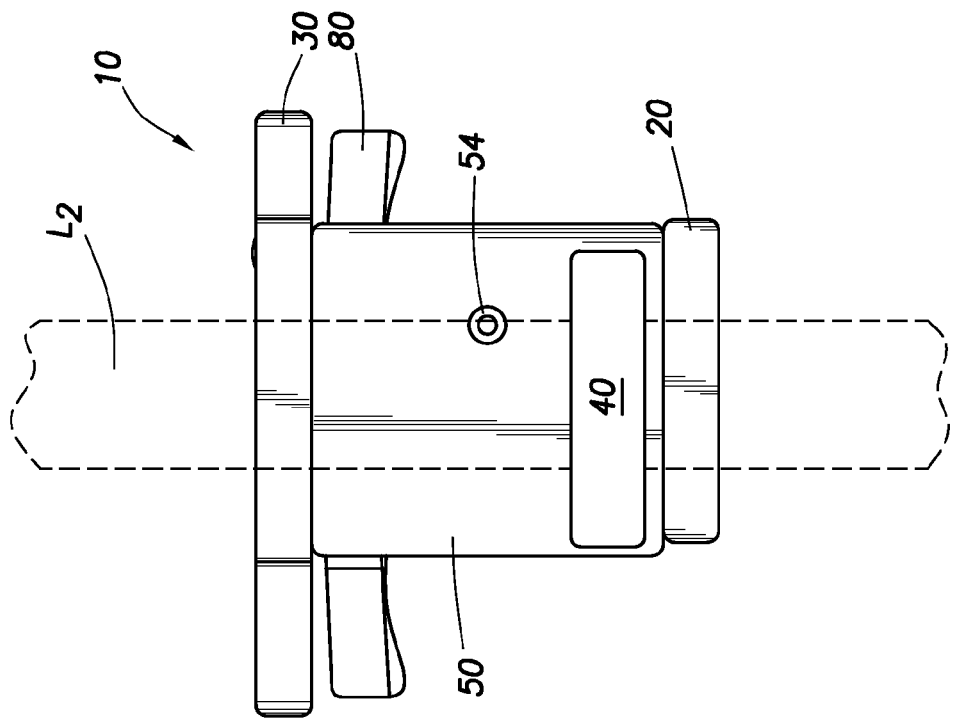
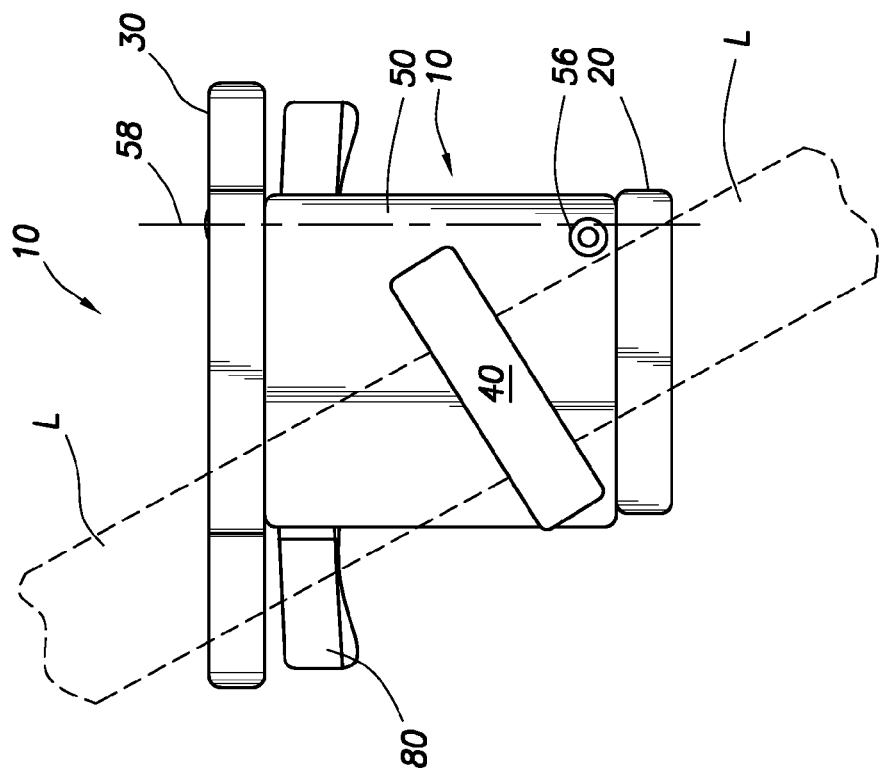

CONTAINER CARRIER

CROSS REFERENCE TO RELATED APPLICATIONS

None.

BACKGROUND

1. Technical Field

This invention relates, generally, to apparatus carrying and supporting containers of various sizes and shapes. In particular, this invention relates to apparatus which can be attached to walkers, wheelchairs, strollers and the like for carrying and supporting drink containers, such as cans, cups, drinking glasses and the like.

Individuals with infirmities, injuries, advanced age, or other disabilities commonly use assist devices for walking. A device "walker" is an example of an assist device used to steady the user's balance when walking. Walkers come in various sizes and shapes, and some with wheels, and others have seats to sit on and rest. The term "walker" as used herein, includes conventional walkers and wheeled walkers, such as "rollators" and the like. "Rollator" is believed to be a trade name for an assist device that consists of a frame with three or four wheels, handlebars and a built-in seat, which allows the user to stop and rest when needed. Rollators can be equipped with a shopping basket. Rollators are typically more sophisticated than conventional walkers with wheels. The handlebars are equipped with hand brakes that can be lifted or pushed downward to instantly stop the rollator. With individuals that cannot safely walk on their own, assist devices, such as wheelchairs, strollers and buggies are used. The structural frames of these devices typically comprise lightweight tubing of various sizes, arranged in trusses and other configurations. These devices must not have protruding portions and must have a size and shape enabling safe navigation of tight spaces and avoiding snaring objects and structures. The frames of these devices are shaped to create an interior space that the user may walk or sit in. These interior spaces must not be permanently obstructed for that space to remain useful.

When using walkers, it is necessary, at times, to carry various size and shapes of containers for liquids and solids, such as a water bottle, canned drink, baby bottle, coffee cup, ice cream cup, and the like. Since safely operating these devices usually occupies one or both hands, a need exists to provide a hands free means for carrying a container. It is essential that the carrier, when installed, not create obstructions to use or mobility. Additionally, the carrier should preferably have a simple construction that is durable and inexpensive to manufacture. Due to the variety of structural designs of these devices, a container carrying means ideally must have multiple mounting options. It is preferable that the carrier accommodate various container sizes and shapes.

2. Background Art

Prior art container carriers exist in the market that can be attached to walkers and other assist devices. These carriers were designed to accommodate a variety of frame sizes and shapes and drink sizes and shapes but, when installed on the exterior of the walker, have increased the width and decreased the mobility of the walker. When installed on the interior, these prior art carriers have obstructed the interior space provided for the user to sit and stand. These devices have been expensive to manufacture.

Accordingly, there is a need for a container carrier that is easy to install and inexpensive to manufacture and does not decrease the usable, interior space of the device or permanently obstruct its interior space.

SUMMARY OF THE INVENTIONS

In one embodiment, this invention relates to a versatile container carrier or holder that can be attached to a walker. In other embodiments, the container carrier can be attached to other devices, such as wheelchairs, strollers and the like. In further embodiments, the carrier can be removable, attached to devices with a variety of frame element shapes and sizes. In other embodiments, the container carrier of the present invention accommodates containers of various sizes and shapes. In a further embodiment, the container carrier of the present invention pivots between a use and retracted positions. In additional embodiments, the carrier of the present invention is durable and simple and inexpensive to use and manufacture.

BRIEF DESCRIPTION OF THE FIGURES

The advantages and features of the present invention can be understood and appreciated by referring to the drawings of examples attached hereto, in which:

FIGS. 7A and B are at the rear of the carrier of the present invention installed on inclined and upright tubular members (illustrated in phantom lines).

DETAILED DESCRIPTION OF THE INVENTIONS

Figure 1:
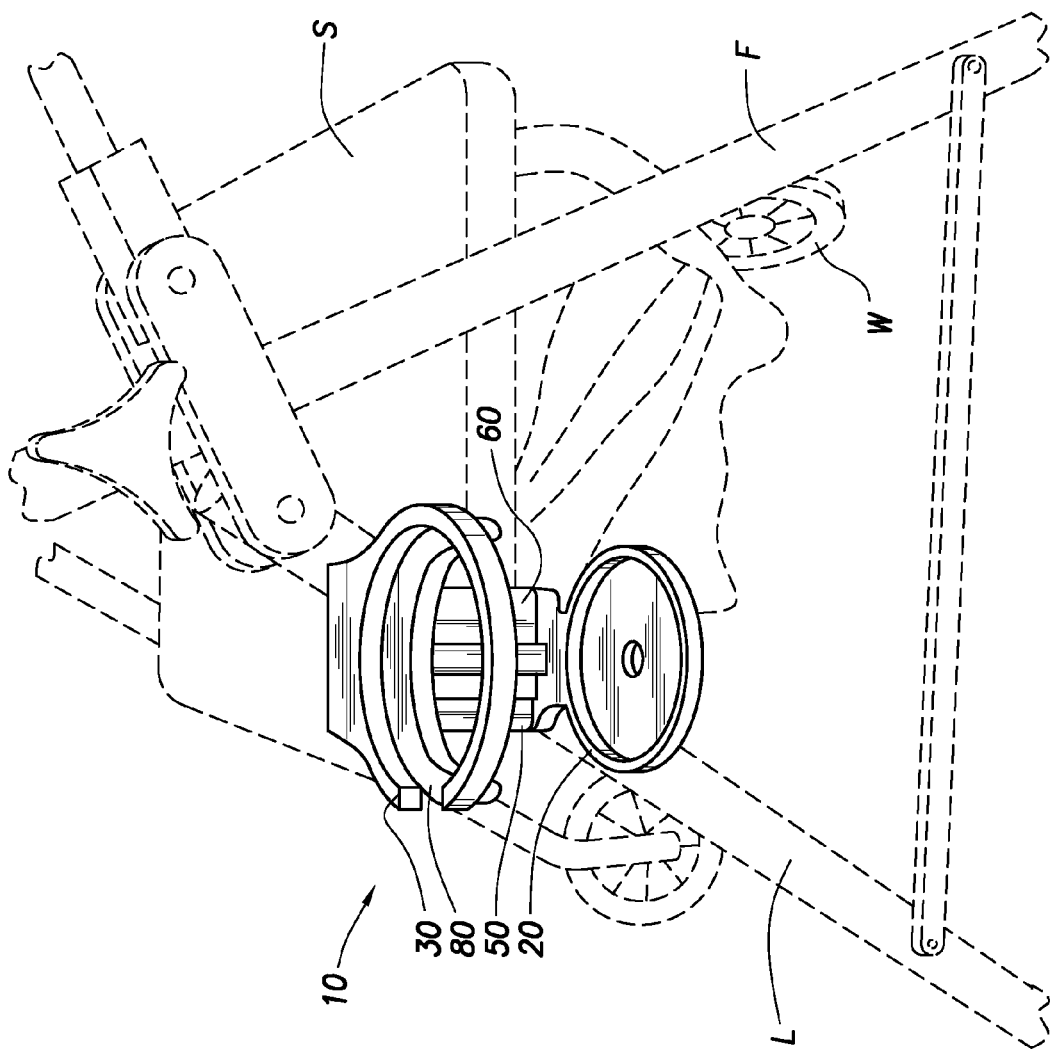
FIG. 1 is a perspective view of the container carrier of the present invention, illustrated installed on a rollator type walker (illustrated in phantom lines) with the carrier illustrated in the extended position and with the reducer in the upright position.

Referring now to the drawings, wherein like or corresponding parts are designated by like or corresponding reference numbers throughout the several views, there is illustrated in FIG. 1, an embodiment of the container carrier 10 removably installed on the inclined frame leg L of a rollator type walker. This particular walker configuration is of the type that has a tubular truss frame F, wheels W, a seat S, and handles (not shown) for the user to grasp. As illustrated in FIG. 1, the carrier 10 includes a base 20 for supporting a container and a stabilizing ring assembly 30.

The details of the construction of the carrier 10 will be described by referring to FIGS. 2-7. It can be seen in that the carrier 10 comprises a few basic structural elements, including, the base 20, stabilizing ring 30, U-shaped brackets 40, the mounting flange 50, flange 60, reducer pivot flange 70 and reducer 80. As illustrated, these elements are assembled into two subassemblies pivotally connected together. The first subassembly comprising: mounting flange 50 and U-shaped brackets 40. The second subassembly comprising: base 20, stabilizing ring 30, flange 60, reducer pivot flange 70 and reducer 80. These structural elements are formed from a plastic sheet material, such as high density polyethylene (HDPE).

Figure 4:
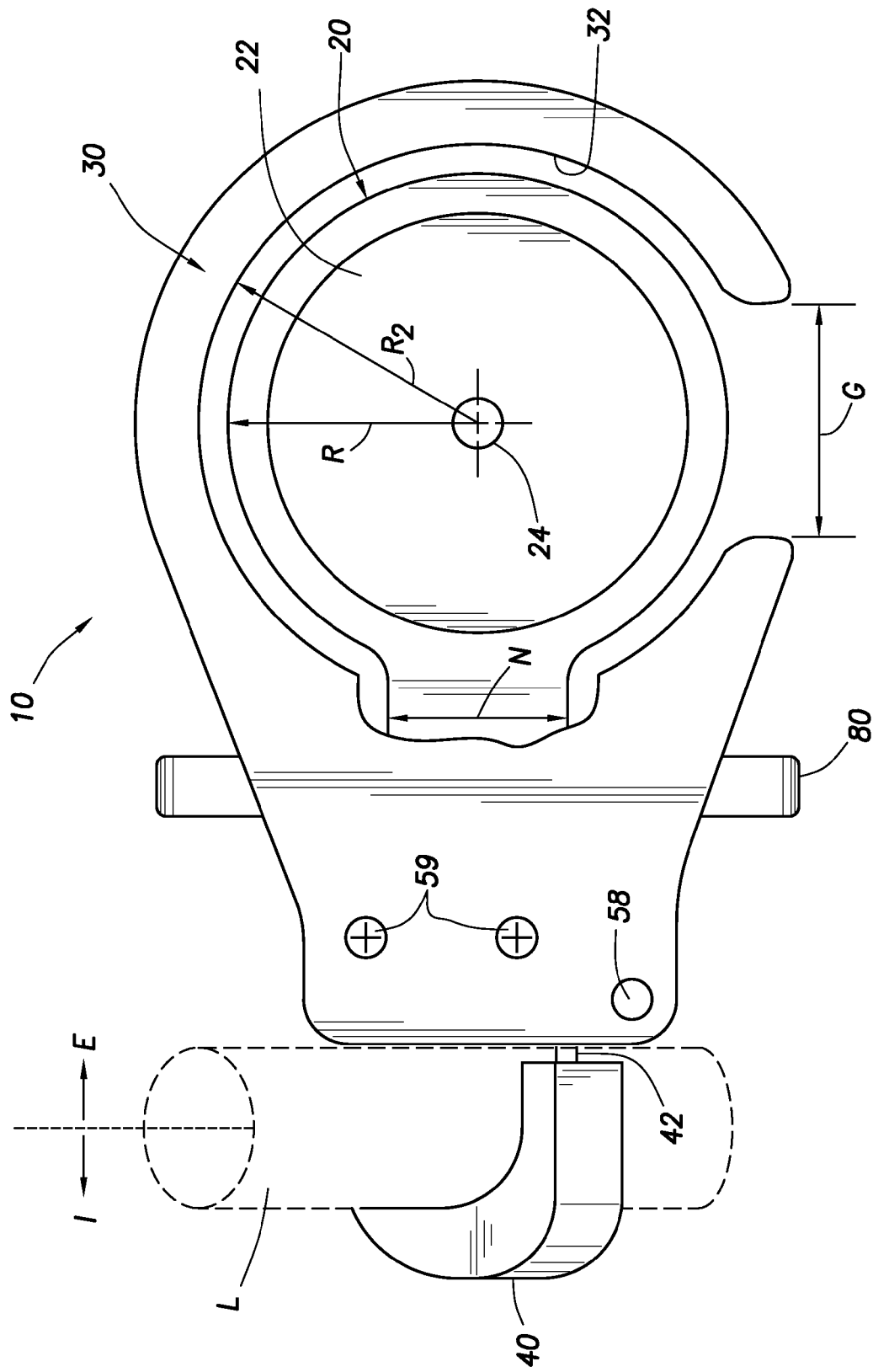
FIG. 4 is a top view of the carrier of the present invention installed on a tubular member (illustrated in phantom lines) with the carrier illustrated in the extended position with the reducer rotated down.

The flanges 50, 60 and 70 span the distance between the base 20 and stabilizer ring 30. Flange 60 and reducer pivot flange 70 have their upper and lower ends connected to base 20 and stabilizing ring 30. As illustrated in FIG. 4, recessed screws 59 extend through stabilizer ring 30 and are threaded into the flange 60. Flange 70 is captured by recessed pockets in the base 20 and stabilizer ring 30 reducing material costs and assembly time. Similar recessed screws (not shown) extend through the base 20 and into the flanges 60 and 70.

Figure 2:
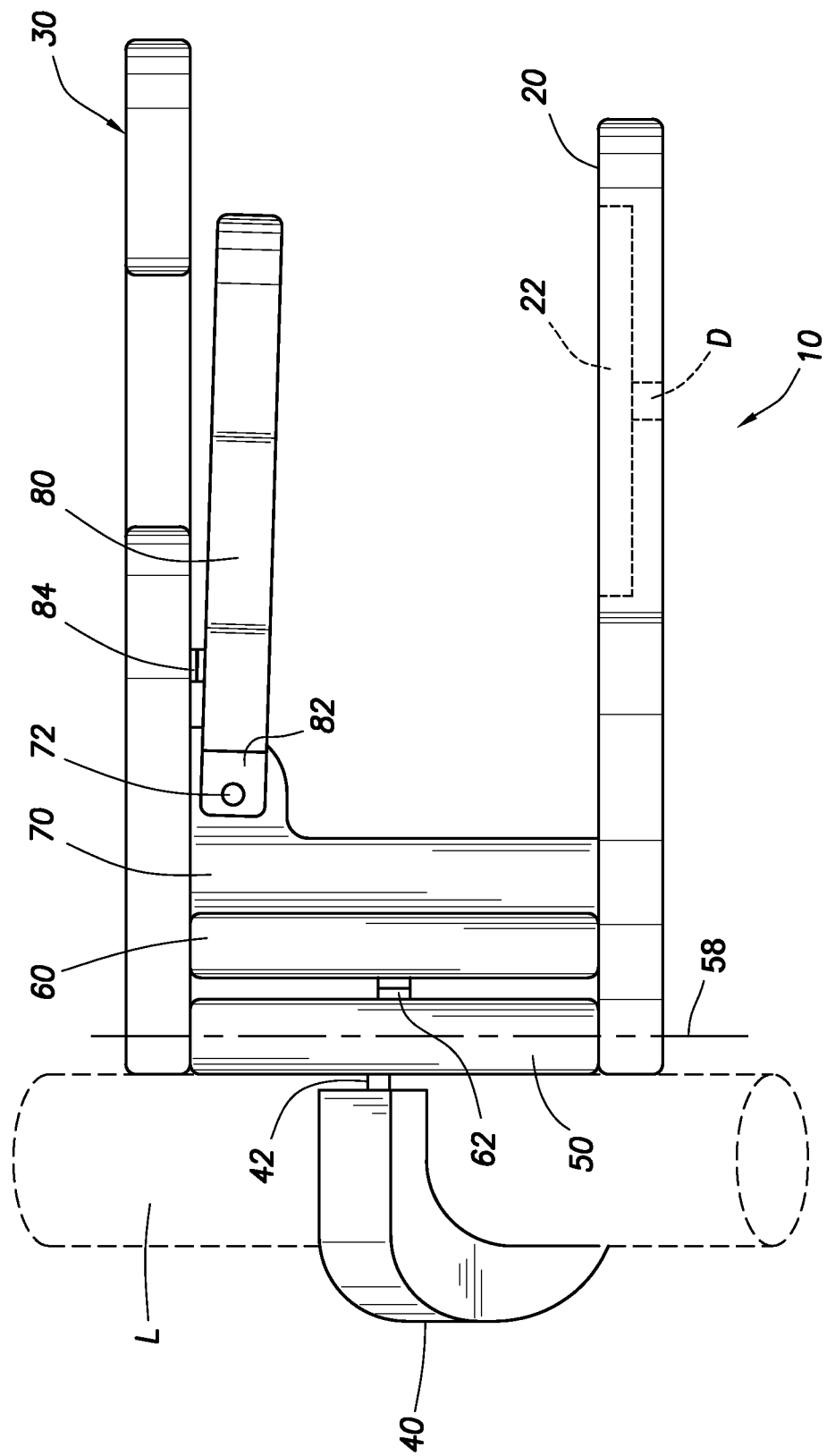
FIG. 2 is a left-side elevation view of the carrier of the present invention, installed on a tubular member (illustrated in phantom lines) with the carrier illustrated in the extended position and with the reducer in the upright position.
Figure 3:
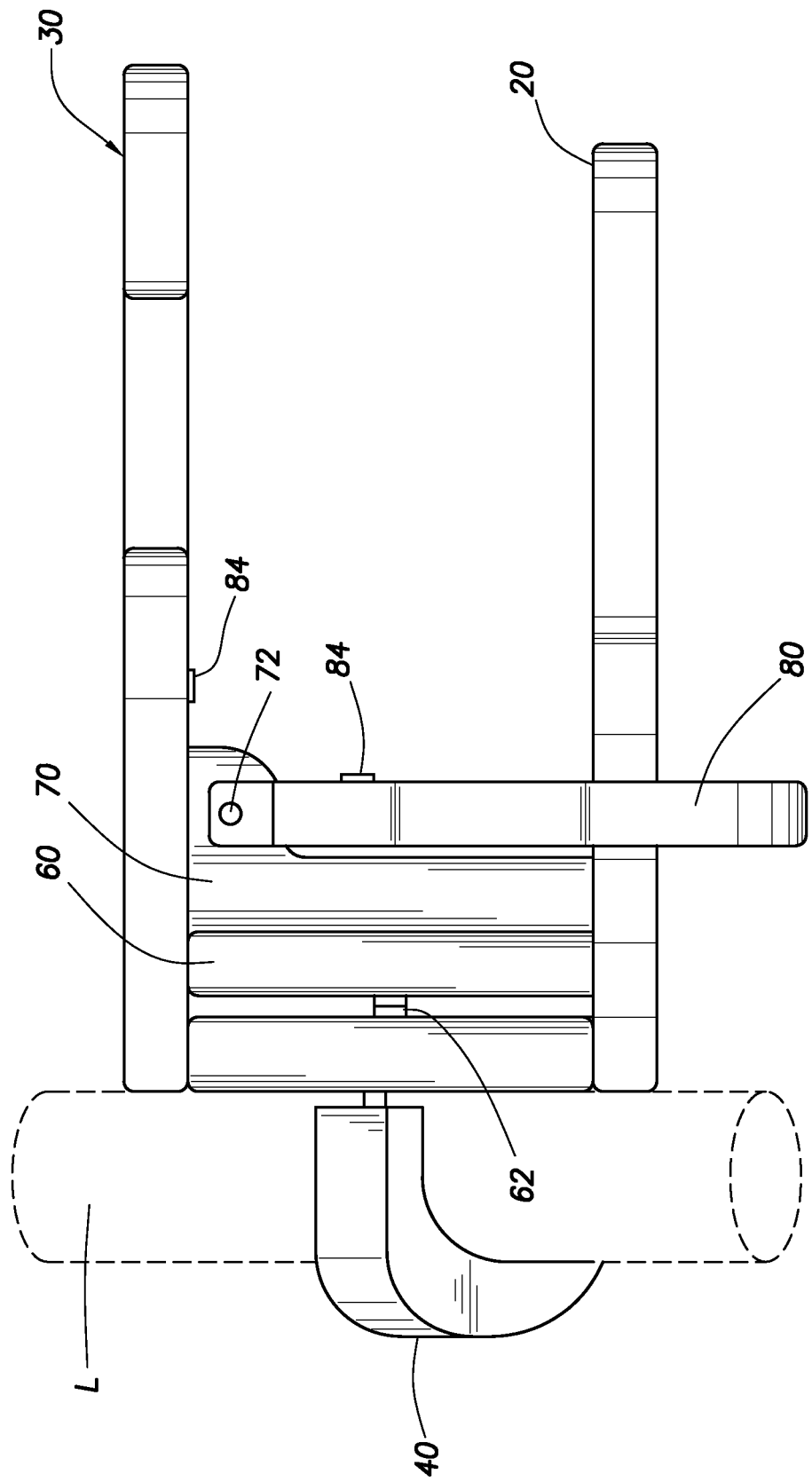
FIG. 3 is a left-side elevation view of the carrier of the present invention, installed on a tubular member (illustrated in phantom lines) with the carrier illustrated in the extended position and with the reducer rotated down.
Figure 5:
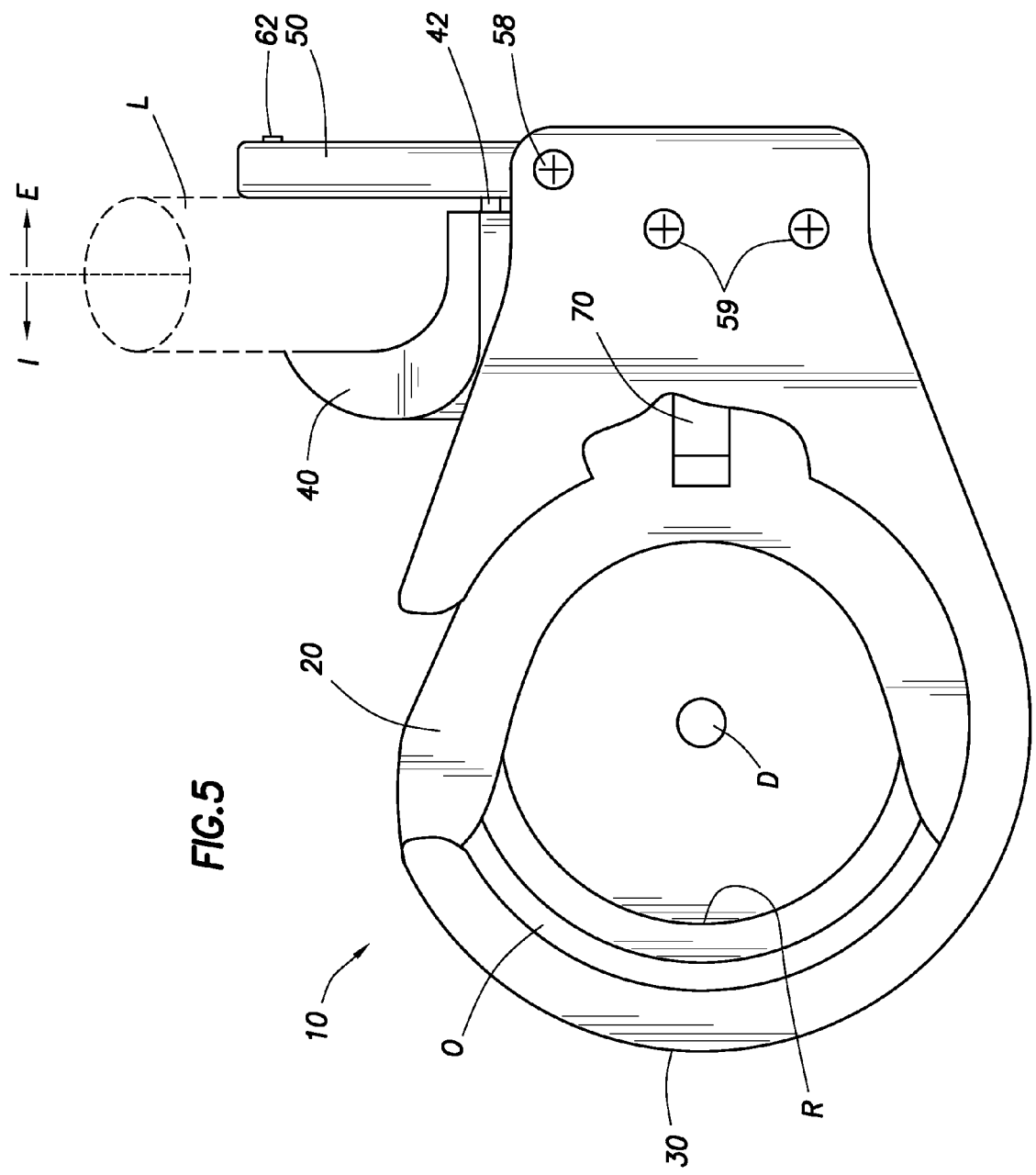
FIG. 5 is a top view of the carrier of the present invention, installed on a tubular member (illustrated in phantom lines) with the carrier illustrated in the retracted position and with the reducer rotated up.

As illustrated in FIGS. 2, 4 and 5, base 20 has a generally horizontally extending circular portion with an outer radius R. Base 20 is necked down to a width N adjacent the circular portion. The shape of the sides of the neck portion provides clearance for leg L of the carrier 10 when the carrier 10 is rotated to the interior position, illustrated in FIG. 5. A recess 22 is formed in the base for receiving and stabilizing the bottoms of containers (not shown). A central drain hole 24 is present to prevent the buildup of liquid in the recess R.

As illustrated in FIGS. 4 and 5, stabilizing ring 30 has a generally circular opening 32 with an inner radius R2 extending there through. The opening 32 is centered over the recess 22 in base 20. Stabilizer ring 30 is broken or is discontinuous on one side to form a gap G to accommodate the handles of drink containers, such as mugs and coffee cups.

The costs of fabricating the carrier is reduced by allowing the base 20 to be formed in part from the scrap created by machining the stabilizing ring from sheet material. As long as the Radius R is less than the radius R2 and the gap G is larger than the neck N, the center removed from the stabilizing ring 30 can be used to form the base 20.

Figure 6:
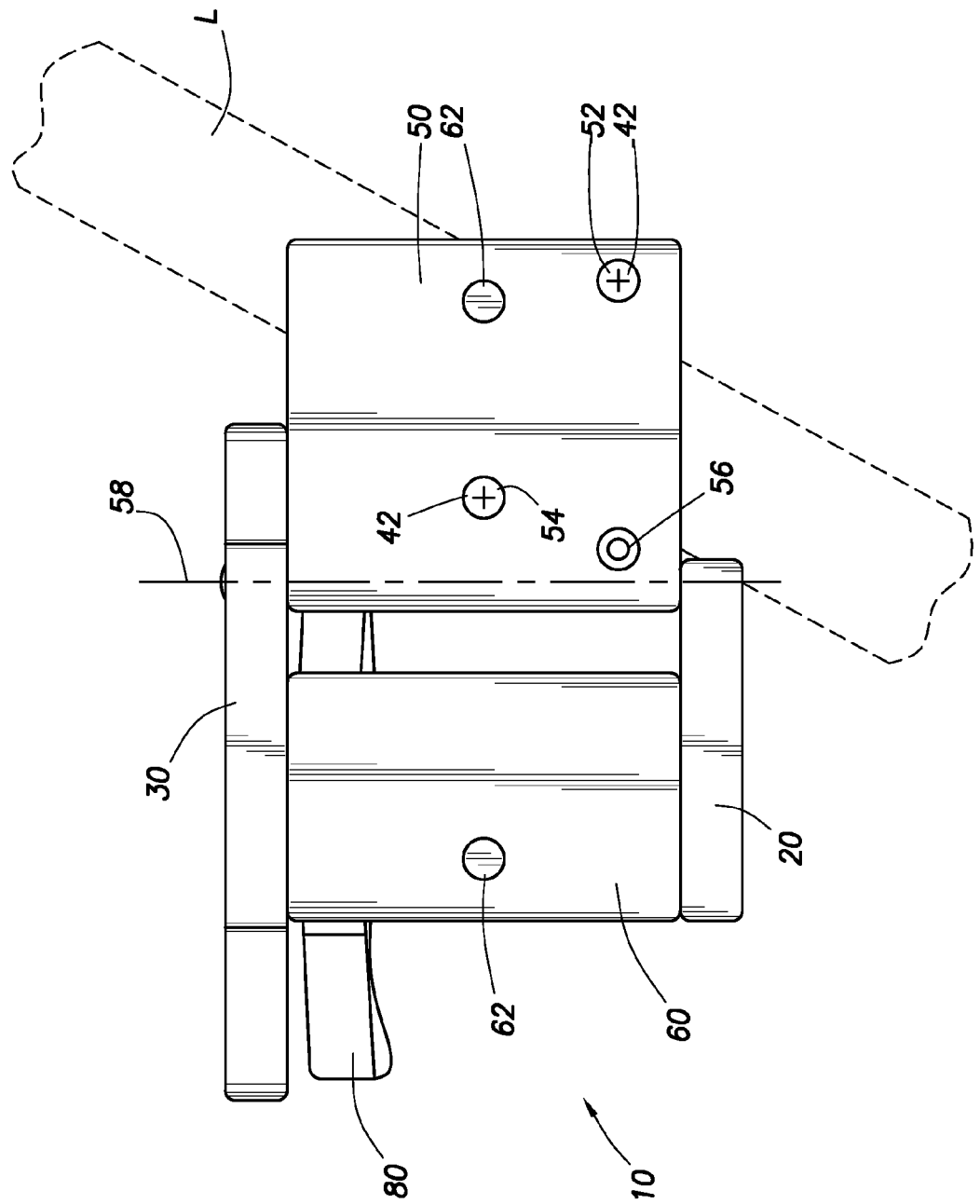
FIG. 6 is a front plan view of the carrier of the present invention, installed on a tubular member (illustrated in phantom lines) with the carrier illustrated in the retracted position and with the reducer in the upright position.

Details of the structure of mounting flange 50 and the U-shaped bracket 40 are best illustrated in FIGS. 6, 7A and 7B. As illustrated in these figures, flange 50 is generally rectangular shaped and in this embodiment is provided with a plurality of countersunk bores 52, 54 and 56. By providing a plurality of pre-drilled bores arranged in various configurations allows the carrier 10 to be mounted on tubular structure members extending at various angles. In FIG. 7A, the carrier 10 is illustrated using U-shaped bracket 40 to clamp around an inclined structural member, such as leg L of a walker. In FIG. 7B, U-shaped bracket 40 is shown clamped around a vertical leg L2. In FIGS. 6 and 7A, screws 42 are illustrated extending through bores 52 and 54 and are threaded into the legs of the U-shaped bracket 40. These screws, when tightened, clamp the structural member between the U-shaped bracket 40 and the mounting flange 50. In FIG. 7B, the bracket 40 is attached to the flange 50 through bores 52 and 56. Although only three predrilled bores are illustrated in these figures, is appreciated that more bores at different angles in configurations could be present in the mounting flange to accommodate attachment to a variety of different devices. It also should be appreciated that a plurality of different U-shaped brackets 40 could be supplied with the carrier to accommodate attachment to a variety of shapes and sizes of structural elements.

A vertically extending pivot axis 58 allows the container holding portion of the carrier 10 to pivot between the positions illustrated in FIGS. 4 and 5. The pivot 58 extends through the mounting flange 50, base 20 and stabilizing ring 30. Pivot 58 allows the carrier 10 to be mounted on the exterior E of the walker or other device as illustrated in FIGS. 1 and 4, out of the interior I of the device so that it does not inhibit use of the interior I of the device. For example, if a user is resting on the seat S of a walker or the like, the carrier is assessable yet out of the way. In FIG. 5, the carrier 10 is illustrated rotated about pivot 58 in the direction of the interior I of the walker. With the carrier 10 rotated into the interior, the walker can be used and moved through doorways or other tight spaces without interference from the carrier 10.

Another feature of the carrier 10 is that cylindrical shaped magnets 62 are embedded in flanges 50 and 60. As illustrated in FIG. 6, the magnets 62 are positioned so that when the carrier is in the position illustrated in FIGS. 2 and 4, the magnets 62 in the two flanges or aligned and in contact. It should be appreciated that the forces of magnetic attraction between the magnets 62 tend to releasably hold the container carrier 10 in the extended position but allows the carrier 10 to be rotated to the retracted position in the interior of the walker by overcoming the magnetic forces. As can be seen in the figures, the shape of the exterior of the base allows the container carrier to rotate into the interior of the walker without interfering with the walker's frame. In this manner, all or substantially all of the base will rotate into the interior of the walker, in a position out of the way.

An additional feature of the carrier 10 is that it accommodates containers of various sizes and shapes. As previously pointed out, the gap G in the support ring 30 provides a clearance for containers with handles, such as coffee cups and mugs. In addition, the containers of various sizes are accommodated by utilizing a pivoting reducer 80. The reducer 80 has a bifurcated end 82 which is pivotally attached to the reducer pivot flange 70 by horizontally extending pivot 72. As illustrated, reducer 80 pivots between horizontal position adjacent to the stabilizer where it can engage and stabilize a smaller container and a vertically extending position when out of use. The magnetic forces of aligned magnets 84 embedded in stabilizing ring 30 and reducer 80 releasably tend to hold the reducer 80 in the position illustrated in FIG. 2.

While the preceding description contains many specificities, however, it is to be understood that same are presented only to describe some of the presently preferred embodiments of the invention, and not by way of limitation. Changes can be made to various aspects of the invention, without departing from the scope thereof.

Therefore, the scope of the invention is not to be limited to the illustrative examples set forth above, but encompasses modifications which may become apparent to those of ordinary skill in the relevant art.

What is claimed is:

1. A container carrier for attachment to the frame of a mobile assist device, such as walkers, wheelchairs, strollers, or the like, comprising:

a container support, comprising a rigid base member defining a support surface for receiving a container in an upright position;

a clamp for use in attaching the container support to a tubular frame of the assist device with the support surface in a horizontally extending position; and a container support pivot connecting the container support to the clamp, the pivot orientated to permit the container support to pivot about a vertical axis, and wherein the shape of the rigid base member and the container support pivot connecting the container support to the clamp allows the container support to pivot into and out of a first angular position and, wherein the container support additionally comprises a magnet releasable retaining the container support in the first position.

2. The container carrier of claim 1, wherein the clamp comprises a pair of spaced members connected together by a threaded connector.

3. The apparatus of claim 2, wherein one of the two members is U-shaped.

4. The apparatus of claim 1, wherein the container support additionally comprises a container stabilizer, extending in parallel-spaced relationship to the base member.

5. The apparatus of claim 4, wherein the container stabilizer comprises a C-shaped support ring with a gap to accommodate container handles.

6. The apparatus of claim 5, wherein the base member comprises a neck, extending from the support surface and, wherein the neck is connected to the container support pivot.

7. The apparatus of claim 6, wherein the neck of the base member is narrower than the support ring gap.

8. The apparatus of claim 1, wherein the container support additionally comprises a reducer connected to the container support to pivot about an axis, extending at a right angle to the container support pivot.

9. A user mobile assist device, comprising:
- a frame of tubular materials surrounding an interior space; handles associated with the frame for grasping and moving the assist device; and
- a container support comprising a first portion attached to the assist device and a second portion comprising a horizontally extending surface of a size to support a container in an upright position; a pivot connecting the first portion to the second portion, the pivot oriented to permit the container support to pivot about a vertical axis;
- wherein the shape of the second portion and angular range of pivot permits the second portion to pivot between a first angular position, wherein the second portion is located substantially in the interior of the assist device and second angular position, wherein the second portion is located substantially outside of the interior of the assist device, and additionally comprising means to resist pivoting of the second portion out of the second position, wherein the means to resist pivoting is a magnet.

10. The apparatus of claim 9, wherein the first portion comprises a clamp for use in attaching the container support to a tubular frame of the assist device.

11. The apparatus of claim 9, wherein the second portion additionally comprises a container stabilizer.

12. The apparatus of claim 11, wherein the container stabilizer extends in parallel-spaced relationship to the horizontally extending surface.

13. The apparatus of claim 11, additionally comprising a reducer connected to the second portion to pivot about a horizontal axis.

14. The apparatus of claim 13, wherein the reducer pivots into and out of a spaced parallel relationship with the container stabilizer.

15. The apparatus of claim 9, wherein the device is a rollator type walker.

16. A container carrier for attachment to the frame of a mobile assist device, such as walkers, wheelchairs, strollers, or the like, comprising:
- a container support, comprising a rigid base member forming a support surface which, when installed, extends horizontally for receiving a container in an upright position,
- the container support additionally comprises a container stabilizer extending in parallel-spaced relationship to the base member, the container stabilizer comprising a generally C-shaped support ring defining a gap therein;
- a clamp for use in attaching the container support to a tubular frame of the assist device with the support surface in a horizontally extending position; and
- a container support pivot connecting the container support to the clamp, the pivot oriented to permit the container support to pivot about a vertical axis; and
- wherein the base member comprises a neck extending from the support surface, the neck connected to the container support pivot, and wherein the neck of the base member is narrower than the support ring gap.

17. The container carrier of claim 16, wherein the base member is fabricated at least in part from scrap created by machining the container stabilizer from sheet material.

* * * * *